Figure 1:
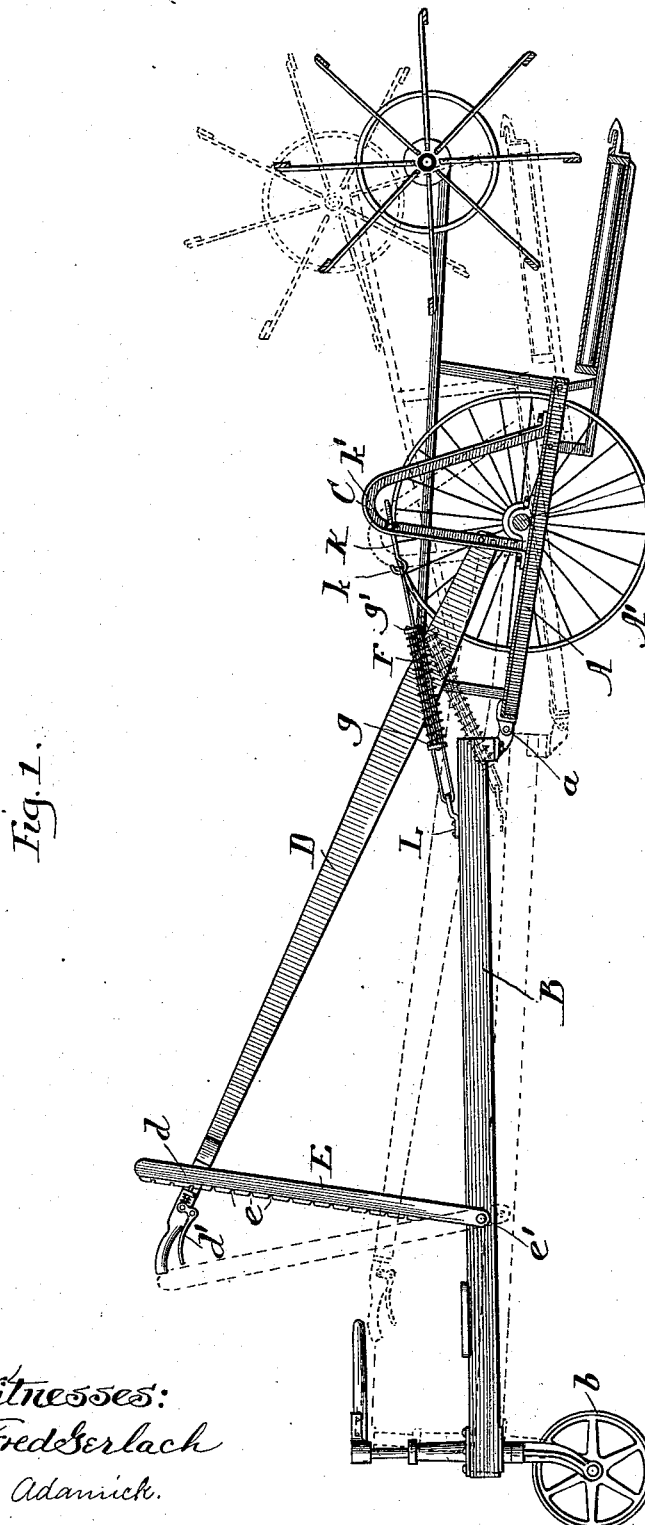

(No Model.)

U. A. UBBEN & J. B. MOHLER.
HARVESTER.

No. 532,502. Patented Jan. 15, 1895.

Witnesses:
Fred Gerlach
A. Adamick.

Inventors:
U. A. Ubben & J. B. Mohler
By Price & Fisher
Attorneys.

UNITED STATES PATENT OFFICE.

UBBO A. UBBEN AND JAMES B. MOHLER, OF PEKIN, ILLINOIS, ASSIGNORS TO THE ACME HARVESTER COMPANY, OF SAME PLACE.

HARVESTER.

SPECIFICATION forming part of Letters Patent No. 532,502, dated January 15, 1895.

Application filed May 15, 1893. Serial No. 474,238. (No model.)

*To all whom it may concern:*

Be it known that we, UBBO A. UBBEN and JAMES B. MOHLER, citizens of the United States, residing at Pekin, in the county of Tazewell, State of Illinois, have invented certain new and useful Improvements in Harvesters, of which we do declare the following to be a full, clear, and exact description, reference being had to the accompanying drawings, forming a part of this specification.

Our present invention has relation more particularly to that class of harvesters commonly known as "grain headers," in which a main carrying frame serves to support the mechanism for cutting and conveying the grain, this main frame being untied by a hinge or pivot connection with a tongue or thrust bar at its rear, for the attachment of the horses thereto. An example of this type of apparatus is illustrated in reissued Letters Patent No. 9,040, granted to A. J. Hodges January 30, 1880. In the construction of this type of machines it has heretofore been customary to provide a spring connection in order to counterbalance the weight of the main frame in such manner as to enable the operator to more readily raise and lower the cutter bar and reaping platform. This spring mechanism in prior constructions, has been located either upon the hand-lever whereby the operator controls the tilting movement of the main frame or upon the push-pole, but in both constructions the spring has served to connect the operating lever to the push-pole. A serious objection incident to these prior constructions is that when the operator lifts the free end of the operating lever, or hand-lever, in order to raise or lower the cutter bar and the grain platform, the resistance offered by the spring falls upon the operating lever at a comparatively short distance from the free end of such lever. In other words, the axle of the main frame is the fulcrum of the operating lever and the counterbalancing spring offers a great part of the resistance to the lifting of the lever. Hence it has been found that with these prior constructions of headers, when a spring of sufficient force was employed to properly counterbalance the grain platform and its load, it required a very considerable expenditure of power upon the part of the operator to lift the operating lever for the purpose of shifting the platform, particularly when the platform was empty.

The object of the present invention is to so combine the counterbalancing spring mechanism with the main frame and the tongue or thrust bar, that the operator may be enabled to much more readily and easily effect the necessary shifting of the grain platform and cutter bar, and this object of invention we have effected by the novel construction hereinafter described, illustrated in the accompanying drawings and particularly defined in the claim at the end of this specification.

Figure 2:
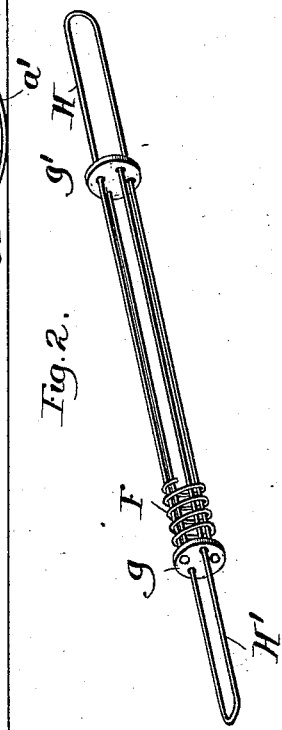

Figure 1 is a view in side elevation of such portions of the grain header as are sufficient to illustrate our invention. Fig. 2 is an enlarged view showing the preferred form of counterbalancing spring.

A designates the main frame of the header and B denotes the tongue or thrust bar, these parts being pivotally united together as at $a$. The main frame A serves to sustain in usual manner the cutting and conveying mechanism and is itself supported upon suitable carrying wheels A', while the rear end of the tongue or thrust bar B is sustained by a caster wheel $b$. Upon the top of the main frame A is mounted a suitable standard $c$, to the lower portion of which is connected the front end of the operating lever D, this lever being provided at its free end with a suitable spring actuating pawl $d$ controlled by a pivoted handle $d'$ and arranged to engage the notches $e$ of the adjusting bar or staff E, this bar E being pivotally connected to the tongue or thrust bar B as at $e'$. By means of the operating lever D the main frame A can be tilted about the axle $a'$ of the carrying wheels A' in order to raise or lower the cutter mechanism and grain platform at the front of the machine.

Between the standard C, which in the preferred form of our invention straddles the axle $a'$, is interposed the counterbalancing spring mechanism, which by preference comprises a coil-spring F arranged between bearing plates $g$ and $g'$. Through the spring F extend the rods or stirrups H and H', the rod or stirrup H being connected to the bearing plate g, while the rod or stirrup H' is fixed to the bearing plate g' and extends freely through perforations in the bearing plate g. The outer portion of the rod or stirrup H is connected to the standard C, preferably by means of an adjusting rod K having a hook k at one end and having its opposite end pass through the standard C and adjustably united thereto by means of a nut k' that engages the threaded end of the rod K. The outer portion of the rod or stirrup H' is connected as by a bracket L with the tongue or thrust bar B. By means of the adjusting rod K the proper tension may be given to the spring F in order to enable it to counterbalance the weight of the cutting and conveying mechanism at the front of the main frame A. By providing the main frame with a suitable standard C and interposing the counterbalancing spring mechanism between the upper part of this standard and the tongue or thrust bar B, a much more direct and effective application of the force of the spring is attained than has been possible in prior constructions and inasmuch as the spring is not attached to the operating lever but is attached to the standard on the main frame, a much more effective leverage can be exerted by the operator since the operator when raising or lowering the cutter bar and grain platform has for this purpose a lever, the unobstructed length of which is from his hand to the main frame or the standard rising therefrom. In other words, inasmuch as the counterbalancing spring is connected to the standard C and not to the operating lever, the operator can much more effectively shift the cutter bar and grain platform by means of this lever, than is possible in prior constructions, in which the spring mechanism is interposed between the operating lever and the tongue or thrust bar.

From the foregoing description it will be seen that when the operator desires to tilt the main frame it is only necessary for him to raise or lower the free end of the operating lever D and the counterbalance spring at such time, under proper adjustment serves to counterbalance the weight of the mechanism at the front of the main frame and to most directly and effectively exert its force in enabling the tilting of the main frame to be secured, and this too, without throwing unnecessary strain upon the arm of the operator. It will be observed that the counterbalancing spring mechanism extends obliquely downward from the upper part of the standard C to the tongue or thrust bar B across the hinged joint between the tongue or thrust bar of the main frame, the purpose of this arrangement being to exert the strain upon the spring mechanism incident to the tilting of the main frame more directly in line with the tongue or thrust bar and thus lessen the danger of lifting the tongue or thrust bar when sudden strains upon the grain platform, as for example in passing over hillocks or the like in field operation and while the operating lever is not locked to the staff or bar E but is held by the hand of the operator.

It is manifest that the precise details of construction above set out may be varied within wide limits without departing from the spirit of the invention. Thus other forms of spring mechanism might obviously be interposed between the standard C and the tongue or thrust bar B while still employing our invention.

Having thus described our invention, what we claim as new, and desire to secure by Letters Patent, is—

In a grain header, the combination with a pivotally supported main frame and with a tongue or thrust bar hinged thereto in rear thereof, and with a rearwardly extending operating lever, of a standard rising from said pivoted main frame and spring mechanism interposed between the upper part of said standard and said tongue or thrust bar and extending obliquely downward from the standard to the thrust bar, substantially as described.

UBBO A. UBBEN.
JAMES B. MOHLER.

Witnesses:
W. H. BINNIAN,
O. J. HASTINGS.